(No Model.)
W. WILLIAMSON.
DRILL AND TAP MACHINE.
No. 575,538. Patented Jan. 19, 1897.
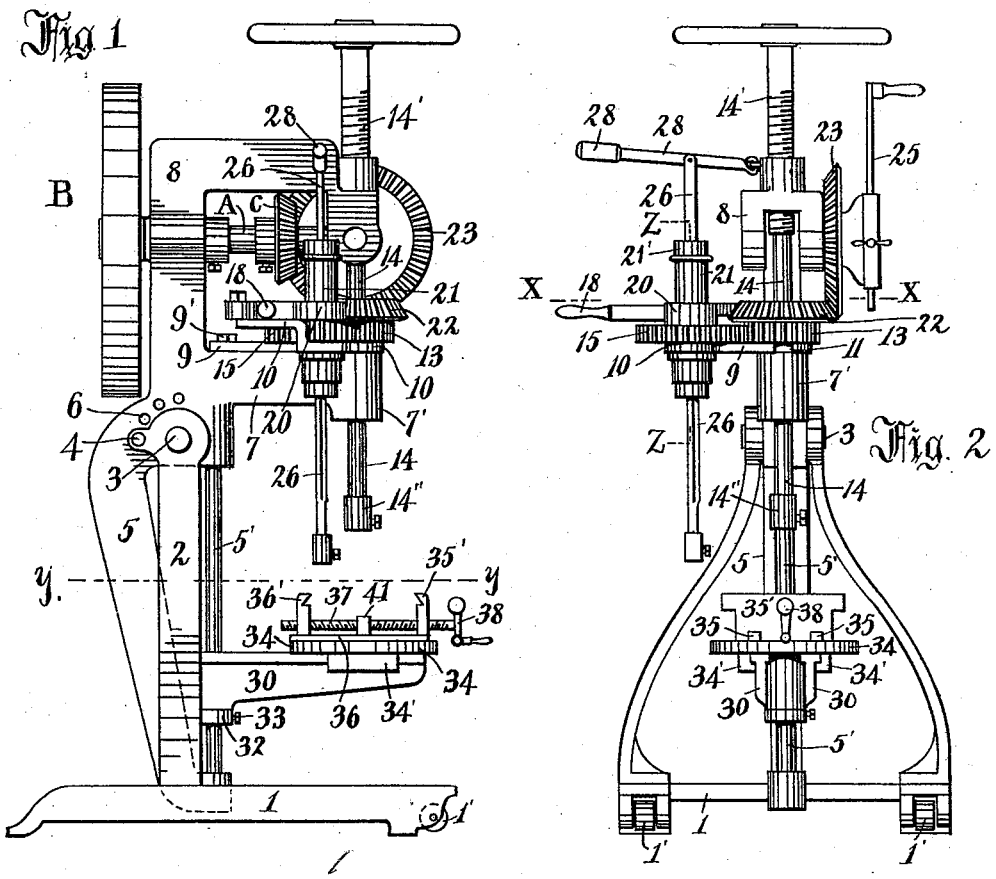
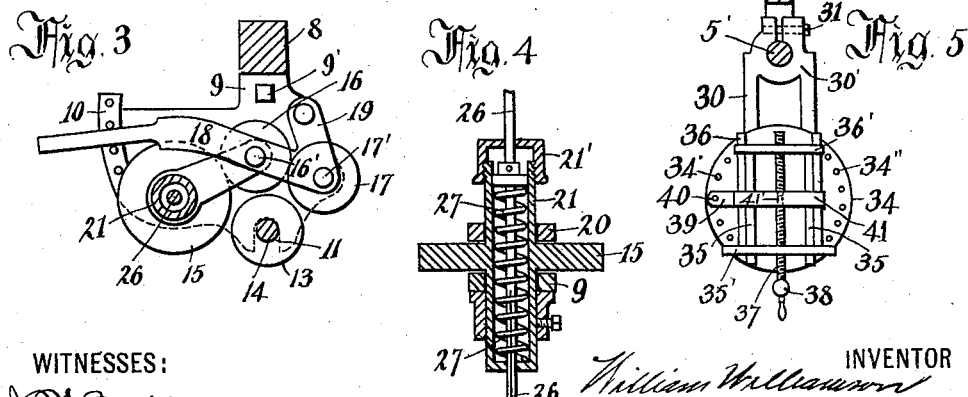
WITNESSES:
INVENTOR
William Williamson
BY
ATTORNEY

UNITED STATES PATENT OFFICE.

WILLIAM WILLIAMSON, OF SAGINAW, MICHIGAN.

DRILL AND TAP MACHINE.

SPECIFICATION forming part of Letters Patent No. 575,538, dated January 19, 1897.

Application filed April 11, 1896. Serial No. 587,131. (No model.)

*To all whom it may concern:*

Be it known that I, WILLIAM WILLIAMSON, a citizen of the United States, residing at Saginaw, in the county of Saginaw and State of Michigan, have invented a certain new and useful Combined Drill and Tap Machine; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is an adjustable combined drill and tap; and it consists in the construction and arrangement described and shown.

Figure 1 is a side elevation. Fig. 2 is a front elevation; Fig. 3, a plan on line X X of Fig. 2. Fig. 4 is a section on line z z of Fig. 2. Fig. 5 is a plan on line Y Y of Fig. 1.

In the drawings, 1 is the base of the drill-frame and is provided on one end with rollers 1', journaled in the base, whereby the machine may be readily and easily moved as desired.

2 2 are standards of the base bowing together and forming a journal-bearing for the shaft or pivot 3, carrying the frame 5, and operating parts of the machine, as will hereinafter appear.

5 is a drill-frame and at the joint of pivot 3 is provided with several holes 6 for receiving a pin 4 for holding the frame after it has been turned as desired on the pivot 3. The frame 5 and the depending rod 5' support the adjustable bed-piece 30, hereinafter described.

7 is a laterally-extending arm of the frame and forms the support for the tap-operating mechanism.

9 is a bed-piece removably secured to the arm 7 and carries the tap and its gearing and adjustable mechanism.

8 is an arm extending parallel with arm 7 and carries the drill-operating mechanism.

14 is the drill-spindle, attached to the drill feed-screw 14' in a threaded hole in the end of arm 8 and is provided with the socket 14" for the tool in its lower end.

The spindle passes through the hub 7' on the end of arm 7 and is operated by the gear-wheel 22, keyed thereto, engaging the gear 23, propelled by crank 25 or by the gear C' on shaft A, journaled in frame and propelled by belt on pulley B.

Journaled in the bed-piece 9 at the side of the drill-spindle is gear-wheel 15, having a hollow hub 21, holding the spindle 26 of the tap, and a spring 27, wound around the spindle within the hub and resting on the lower end of the hub. A collar on the spindle within the hub rests upon the top end of the coiled spring and depressing the spindle depresses the spring. The nut 31 on the top of the hub retains the spring within the hub. The lever 28, pivoted to the frame and attached to the upper end of the spindle 26, provides means for feeding the tap-tool when placed within the socket 26'.

By the lever 18, pivoted to the bed-piece, I provide means for throwing the tap-gear in and out of gear—viz., 16 and 17 are journaled in the lever 18 at 16' and 17' and mesh together, the gear 16 also meshing into the large pinion 15 and held to it by the clip 20, secured to the journal of both 15 and 16. By moving the lever to the front the pinion 16 will also engage the gear 14, which, when the drill mechanism is in motion, will revolve the tap-gear 15. By moving the lever backward instead of forward the pinion 17 may be made to engage the gear 14, and 17 meshing also into 16 and 16 with 15 turns 15 in the opposite direction to its movement when the lever 18 is moved forward. It will thus be seen that by one movement of the lever 18 the tap may be revolved in one direction, and by the opposite movement of the lever it will be revolved in opposite direction.

10 are pins in the base-plate 9 for holding the lever in its different positions.

By loosening the bolt 9' the base-plate and the tap mechanism may be removed.

Fig. 5 illustrates my adjustable drill-table. 30 is the support for the table, and is carried on the rod 5', secured in the frame 5. The knuckle 30' holds the table on the rod 5', and by means of the set-screw 31 I can secure the table to the shaft at any desired height. 34 is a disk adapted to slide on the supports 30 and be adjusted thereby. 35 and 36 are sets of parallel strips pivoted at 41 to top of disk 34 and form a guideway for its adjustable vise. 35' and 36' are the movable jaws of the vise, secured to 35 and 36, respectively. 37 is a rod having opposite threaded ends engaging the jaws 35' and 36' and operated by the crank 38, whereby, by turning the crank, they may be made to approach each other or recede.

The collar 32 and set-screw 33 under the table 30 provide means for holding the table at any desired height when it is desirable to have the knuckle 30' loose on rod 5 in order that it may be adjusted to either the drill or tap, or both.

39 is a lug on the vise, having a pin 40 passing through it and adapted to enter any of the holes 34'' on the disk 34, thereby holding the vise in any position it may be adjusted circularly. It will therefore be seen that the support for the table-vise is adjustable circularly, the table adjustable radially, and the jaws circularly or radially.

As previously referred to, the pivot 3 supports the mechanism and affords means for changing the entire frame from a vertical to horizontal or any angle desired.

When placed at an angle, it may be more convenient to have the crank 28 and gearing 23 upon the opposite side of the frame. This, it is obvious, can be easily done.

Having thus described my invention, what I claim as new, and desire to secure by Letters Patent, is—

1. In a drill, the combination with a movable base, upwardly-extending arms from the base having pivoted between them the drill-frame, of the drill-frame pivoted as specified, the rod 5 secured in the drill-frame and having adjustably clamped thereto the drill-table support, and means for clamping the drill-table support to the rod as specified, and the drill-table support as described, and means for moving the drill-table radially along its support, substantially as specified.

2. A drill, comprising the drill-spindle and tool, journaled in a pivoted frame, wheels in train operating the drill, propelled by any power, and a laterally and circularly adjustable table secured to the pivoted frame and movable with it, and adjustable vise on the adjustable table, the vise adjustable radially and circularly, as described.

3. A combined drilling and tapping machine, comprising a drill-spindle and tool journaled in the main frame, and propelled from the main shaft, and a tapping tool and spindle journaled in a supplemental frame supported on the main frame and carrying wheels in train journaled on a lever pivoted to the supplemental frame, one or more of the wheels in train adapted to be thrown, by the movement of the lever, in and out of gear with the drill-operating mechanism, as described.

4. A combined drilling and tapping machine, comprising a drill and tool spindle, and a tapping tool and spindle, the drill-spindle journaled in a main frame, the tapping-spindle journaled in a movable frame at the side of the drill-spindle a lever pivoted to the movable frame and carrying wheels in train, means connecting one of the wheels in train with a pinion on the tapping-spindle, whereby when the lever is moved in one direction the wheel in the train connected to the pinion on the tapping-pinion will engage a pinion on the drill-spindle, and the pinion on the tapping-spindle and when moved in the opposite direction the other of the wheels in train will engage the drill-spindle and thereby reverse the motion of the tapping-spindle, and means for turning the drill-spindle, as described.

5. An attachment for drills, comprising a frame adapted to be secured to the main frame and support the tapping tool and spindle near the drill tool and spindle, a lever pivoted in the detachable frame and carrying pinions in train, either of said pinions adapted to engage the pinion on the drill-spindle, as the lever is moved, one of the pinions engaging the pinion on tap-spindle whereby as either of the pinions on the lever is moved into engagement with the pinion on the drill-spindle, the tap-tool will be operated as specified.

6. In a drill, the combination with the frame of a drill tool and spindle carrying a pinion, journaled in the frame, and means for operating the drill, of a frame adapted to be removably secured to an arm of the frame, a tap tool and spindle journaled in the removable frame, the spindle carrying a pinion, a lever pivoted to the removable frame, and carrying two pinions in train, one of the pinions held in constant engagement with the pinion on the tap-spindle, and adapted to be moved into engagement with the pinion on the drill-spindle by a movement of the lever, the other pinion adapted to be moved into engagement with the pinion on the drill-spindle by the opposite movement of the lever, and a tap-tool-feeding lever, fulcrumed to the main frame, and engaging the tap-spindle whereby the tap-spindle may be depressed, as described.

7. In a feed mechanism for a tapping-machine, a gear-wheel on the tap-spindle and having a long hub, journaled in the frame, a spring within the hub and around the spindle and resting upon the lower end of the hub, a collar on the spindle within the hub and resting upon the top of the spring, a retaining-cap on top of the hub, and a lever engaging the top of the spindle, and fulcrumed to the frame, whereby the spindle and tool may be depressed, as described.

8. In a combination drill and tap machine, the combination with the base having rollers, a pivoted frame, a drill-spindle journaled in the frame, a driving mechanism secured to the frame, a pinion on the drill-spindle engaging the driving mechanism, of a frame removably secured to the main frame and having journaled therein a gear-wheel carrying a tap-spindle and means for feeding the tap, a lever pivoted to the removable frame and carrying two pinions in train, one of the pinions constantly in engagement with the pinion of the tap and adapted to be moved into engagement with the drill-pinion whereby the tap-tool may be reversed, and a vertically, laterally, circularly adjustable table, and an adjustable vise on the table, as described.

In testimony whereof I hereunto affix my signature in the presence of two witnesses.

WILLIAM WILLIAMSON.

Witnesses:
A. H. SWARTHOUT,
MAGGIE BERRY.